United States Patent Office 3,832,231
Patented Aug. 27, 1974

---

3,832,231
METHOD OF RENDERING CHLOROSULFONATED POLYETHYLENE RUBBER RESISTANT TO ADHERENCE OF DIRT, AND THE DIRT RESISTING PRODUCTS THEREOF
Paul Otis Nicodemus, Chelmsford, Mass., assignor to General Electric Company
No Drawing. Filed Aug. 21, 1972, Ser. No. 282,403
Int. Cl. H01b 3/28
U.S. Cl. 117—218          14 Claims

ABSTRACT OF THE DISCLOSURE

A method of inhibiting the adherence of dirt to the surface of chlorosulfonated polyethylene rubber bodies comprising applying thereto a coating of methyl-methacrylate resin, and the resin coated, dirt resistant chlorosulfonated polyethylene product. This invention is particularly concerned with rendering Hypalon type rubber electrical applicance power cords resistant to the adherence of defacing soiling materials.

BACKGROUND OF THE INVENTION

Electrical power cords, especially those used with appliances containing heating elements such as flat irons or hot plates, have in the past normally been constructed of rubber insulated metal conductors having asbestos fiber felted thereabout and a cotton braid covering thereover. Recently chlorosulfonated polyethylene rubber, such as Du Pont's Hypalon, has been found to be capable of meeting the Underwriters' Laboratories requirements as an insulation and covering for this type of electrical service and has therefore provided a possible replacement for the prior cumbersome and wear prone, costly braid and asbestos construction.

However, although chlorosulfonated polyethylene rubber effectively fulfills the electrical, heat resistance and other basic requirements for such service, and provides many advantages over the prior complex construction, it was found that this type of rubber presented a granular or porous surface texture which was especially susceptible to the adherence and tenacious retention of dirt or the like soiling materials commonly encountered in and about factory or manufacturing facilities and also in the conditions of potential service such as the floors or counter tops of households or small commercial establishments wherein such appliances are commonly employed. Moreover, the porous or granular nature of the surface of chlorosulfonated polyethylene is accentuated when the material is shaped by means of extrusion, which constitutes the most common and economical manner of forming insulations about a wire conductor.

Accordingly, this propensity for soiling and retention of soiling materials of chlorosulfonated polyethylene rubber presented a major obstacle for esthetic reasons to its otherwise very advantageous and desirable use as an insulation, especially in electric power cords for household or restaurant appliances, and was found to be of such a degree as to prohibit its use in this type of service notwithstanding its otherwise many advantages and savings.

SUMMARY OF THE INVENTION

This invention comprises the discovery that the application of a thin coating of methyl-methacrylate type resin applied dispersed in a suitable organic solvent therefor, renders the surface of chlorosulfonated polyethylene rubber highly resistant to the adherence and retention of soiling materials, and further that the methyl-methacrylate coated rubber body provides a very flexible, lasting and durable soil impermeable surface which is easily wiped free or cleansed of any soiling material which comes into contact therewith. The invention is especially applicable in the construction of electrical power cords for household or domestic heating appliances such as flat irons and cooking utensils wherein appearances are especially significant, and the invention thus enables the use of chlorosulfonated polyethylene rubbers by itself as the covering and insulation with the many attendant advantages thereto.

OBJECTS OF THE INVENTION

It is the primary objective of this invention to provide means of rendering chlorosulfonated polyethylene rubber, and articles formed thereof, resistant to soiling, and soil resisting chlorosulfonated polyethylene rubber products.

It is also an objective of this invention to provide a soil resisting surface treatment or coating which strongly bonds to and maintains effective and lasting adherence with chlorosulfonated polyethylene rubber under all temperature conditions, and which has a high degree of flexibility.

It is a further objective of this invention to provide a soil resisting coating or treatment for chlorosulfonated polyethylene rubber which is stable when exposed to heat and sunlight or ultraviolet conditions, and does not change color or lose its transparency and other attributes.

It is a still further objective of this invention to provide a stable and lasting soil resisting coating material which is easy and economical to apply, and does not impair the electrical or physical, or other properties of chlorosulfonated polyethylene rubber while rendering its surface highly impervious to the pick up and retention of soiling materials.

It is a specific objective of this invention to provide Hypalon chlorosulfonated polyethylene rubber insulated and covered power cords for household appliances such as flat irons and hot plates which resist soiling and can be easily wiped clean and free of any soling materials which may come into contact therewith.

DESCRIPTION OF A PREFERRED EMBODIMENT

Chlorosulfonated polyethylene rubber has been determined to constitute an effective electrical insulating material with good resistance to high temperatures whereby it constitutes a desirable potential insulating covering for heating appliance electrical power cords. However, it was discovered that the fine grain and porous surface of this type of rubber readily picks up and tenaciously retains common dirt or soil such as may be encountered on floors and other surfaces in and about factories, homes and commercial establishments. The high receptivity and strong adherence of soiling materials with chlorosulfonated polyethylene rubber has constituted a formidable obstacle to the use of this rubber insulation covering for household and similar electrical appliance power cords and in related services due to the unsightly appearance of the soiled rubber, and the difficulty of soil removal or cleaning. Moreover, this degrading condition of the products appearance is especially significant with the light or pastel colored power cord coverings now in demand in household appliances, and where the electrical appliance is a kitchen or laundry utensil.

According to this invention, solutions of methyl-methacrylate resins in organic solvents, and in particular such resins containing adhesion promoters, have been found to effectively render chlorosulfonated polyethylene rubber resistant to the reception and retention of soiling materials over extended periods of service life, and without introducing any degrading or adverse characteristics to the rubber or its electrical insulating properties, or in any manner which would impair its performance as an appliance cord insulating covering.

The methyl-methacrylate resin can be easily and effectively applied as a soil preventing coating or treatment to the surface of a chlorosulfonated polyethylene body by common coating means such as typical spraying or dipping techniques, or other coating measures including brushing or wiping, with the resin dispersed in low concentrations in an effective organic solvent therefore. The concentration of resin solvent solution, as will be seen hereinafter, is preferably adjusted to accommodate the particular means of application to attain its most effective and economical administration. Solution concentrations of resin solids should normally be as low as about 10% solute down to about 1% solute for the most effective and uniform application, and preferably between 1.5 to 7.5% of solute by weight.

The methyl-methacrylate resins for the practice of this invention include phthalic and maleic modified methyl-methacrylate resins, and other block polymers of methyl-methacrylate and phthalic and/or maleic containing monomers, as well as plasticized methyl-methacrylates.

Suitable commercial sources of the methyl-methacrylate resins for the practice of this invention include Rohm & Haas Company's Acryloid acrylic resins which are available in organic solution form and sold under the designation of Acryloid B-48N; B-67; and F-10. Acryloid B-48N, which is sold as a 45% solid solution in toluene, is preferred since it provides optimum resistance to soiling with the best and most enduring adhesion and flexibility and long term stability.

The following comprise examples illustrating the practice of this invention in rendering a light or pastel blue colored Hypalon rubber insulation covered appliance power cord for flat irons (Underwriters' Laboratories, Type HPN cord) resistant to pick up and/or retention of dirt.

Example I

A methyl-methacrylate resin solution, Acryloid B-48N (45% solids in toluene), diluted with toluene to about 7.5% resin solids was continuously applied to Hypalon chlorosulfonated polyethylene rubber insulated appliance power cord by progressively dipping or passing the cord through a bath of the resin solution employing a coating tower apparatus to facilitate evaporation of the solvent and coating film formation. The resulting treated cord surface or coating thereon exhibited a high degree of resistance to the adherence of dirt, and any dirt retained thereon could easily and quickly be wiped off with a dry cloth. Moreover, there was no discernible difference in any other property of the Hypalon covered cord from that of the same untreated cord except as to the dirt resistance.

The relative properties of the treated Hypalon insulated cord with the same but untreated cord were as follows:

good adhesion, the coating of Example I exhibited a pronounced superiority in all respects.

Example III

A resin solution for spray application was formulated as follows:

| | Percent by weight |
|---|---|
| Acryloid B-48N (45% resin solids) | 12.35 |
| Cellosolve acetate (ethylene glycol monoethyl ether acetate) | 20.20 |
| Trichloroethylene | 65.43 |
| Silicone oil leveling agent | .02 |
| | 100.00 |

This composition gives a 5.5% resin solids dispersed in a non-flamable solution which was sprayable with commercial spray apparatus. When sprayed upon the same Hypalon insulated cord as the former Examples, and following solvent evaporation, the resin dried to a strongly bonded and highly flexible coating on the Hypalon rubber surface which provided excellent resistance to adherence and retention to soiling materials.

Example IV

The following comprises a 5.5% resin solution for spray application which dries uniformly and rapidly enabling the prompt winding of treated power cord into rolls or coils without the adjoining individual cord strands adhering or sticking together under substantially any degree of weather or humidity conditions.

| | Percent by weight |
|---|---|
| Acryloid B-48N (45% resin solids) | 11.58 |
| Cellosolve (ethylene glycol monoethyl ether) | 27.40 |
| Trichloroethylene | 61.00 |
| Silicone oil leveling agent | .02 |
| | 100.00 |

Although this invention has been described in detail in relation to Hypalon insulation covered power cord or wire, it should be appreciated that it includes the use of the methyl-methacrylate resin compositions and their organic solutions of the invention, and in particular methyl-methacrylate containing mixed polyester of about equal amounts of phthalic and maleic anhydrides with an aliphatic glycol, to render the surface of any body or article such as gaskets or sheaths formed of chlorosulfonated polyethylene rubber resistant to the adherence of soiling materials to the extent that dirt is either not retained thereon, or if retained is readily removable by simply a light wiping with a dry cloth. Moreover, the method and materials of this invention do not detract from or degrade the characteristics of the chlorosulfonated polyethylene rub-

| | Uncoated | Coated |
|---|---|---|
| Sunlight resistance, 7 days | No crease or cracking | No crease or cracking. |
| Heat resistance, 96 hours/121° C | No cracking | No cracking. |
| Smudge marks | No marking on white paper | No marking on white paper. |
| Color stability, 96 hours/65° C | No change | No change. |
| Ultraviolet sunlight, 96 hours | do | Do. |
| Blooming or discolor | None | None. |
| Stain white paper | do | Do. |
| Resistance to applied dirt | Dirt could not be wiped off | Dirt easily wiped off. |
| Original tensile, p.s.i. | 1,510 | 1,502. |
| Aged tensile, 7 days at 121° C | 2,142 | 2,132. |
| Original elongation, percent | 396 | 404. |
| Aged elongation percent, 7 days at 121° C | 125 | 125. |

Example II

A resin solution of 10% solids formed of a diluted blend of equal parts by weight of Acryloid B-67 and Acryloid F-10 was applied by means of the same continuous dip coating technique with the tower apparatus to the same Hypalon rubber covered cord as in Example I. Although this application produced good resistance to soiling and ber substratum, and the flexible coatings retain their invisible and clean colorfree properties for long periods even while exposed to high temperatures and ultraviolet light. Further, the materials of this invention produce a highly flexible protective coating film which retains its strong bond with Hypalon rubber over long periods notwithstanding excessive bending or flexing, and heat and light as is normally encountered with flat iron power cords.

Although the invention has been described with reference to certain specific embodiments thereof, numerous modifications are possible and it is desirable to cover all modifications falling within the spirit and scope of this invention.

What I claim as new and desire to secure by Letters Patent of the United States is:

1. A body of chlorosulfonated polyethylene having a soil resisting surface comprising a coating of methyl-methacrylate resin.

2. The chlorosulfonated polyethylene body of claim 1, wherein the soil resisting surface comprises a coating of plasticized methyl-methacrylate resin.

3. The chlorosulfonated polyethylene body of claim 1, wherein the soil resisting surface comprises a coating of methyl-methacrylate resin modified with a mixed polyester of phthalic and maleic anhydrides.

4. The chlorosulfonated polyethylene body of claim 1, wherein the soil resisting surface comprises a coating of methyl-methacrylate resin modified with a mixed polyester of phthalic and maleic anhydrides and an aliphatic glycol.

5. The chlorosulfonated polyethylene body of claim 1, wherein the soil resisting surface comprises a coating of a block polymer of methyl-methacrylate and phthalic and/or maleic containing monomers.

6. A soil resistant insulated electrical wire comprising an electrical conductor and an insulation thereon comprising chlorosulfonated polyethylene having a soil resisting coating of methyl-methacrylate resin.

7. A soil resistant insulated electrical power cord which comprises an electrical conductor having a covering body of insulation thereon, said covering body of insulation comprising chlorosulfonated polyethylene and having a flexible, soil resisting coating of methyl-methacrylate resin.

8. A method of rendering chlorosulfonated polyethylene bodies resistant to the adherence of soiling materials, comprising coating the surface of a body of chlorosulfonated polyethylene with a solution of methyl-methacrylate resin.

9. The method of claim 8, wherein the surface of the body of chlorosulfonated polyethylene is coated with a solution of methyl-methacrylate resin dissolved in an organic solvent, and the solvent is evaporated.

10. The method of claim 8, wherein the surface of the body of chlorosulfonated polyethylene is coated with a solution of methyl-methacrylate resin modified with a mixed polyester of phthalic and maleic anhydrides.

11. The method of claim 8, wherein the surface of the body of chlorosulfonated polyethylene is coated with a solution of a block polymer of methyl-methacrylate and phthalic and/or maleic containing monomers.

12. The method of claim 8, wherein the surface of the body of chlorosulfonated polyethylene is coated with a solution of methyl-methacrylate resin modified with a mixed polyester of phthalic and maleic anhydrides and an aliphatic glycol.

13. The method of claim 8, wherein the surface of the body of chlorosulfonated polyethylene is coated with a solution of about 1 to 10% by weight of methyl-methacrylate resin solids in an organic solvent.

14. The method of claim 8, wherein the surface of the body of chlorosulfonated polyethylene is coated with a solution of about 1.5 to 7.5% by weight of methyl-methacrylate resin solids dissolved in an organic solvent, and the solvent is evaporated.

References Cited

UNITED STATES PATENTS

| | | | |
|---|---|---|---|
| 2,879,177 | 3/1959 | Nelson et al. | 117—138.8 EX |
| 2,999,772 | 9/1961 | Burk et al. | 117—138.8 E |
| 3,468,826 | 9/1969 | McWhorter et al. | 117—161 UC |
| 3,660,141 | 5/1972 | Yoshnasu et al. | 117—138.8 EX |
| 3,485,653 | 12/1969 | Hermitte et al. | 117—138.8 EX |
| 3,484,540 | 12/1969 | Wilson et al. | 117—218 X |
| 3,541,228 | 11/1970 | Lombardi | 117—218 X |

RALPH HUSACK, Primary Examiner

U.S. Cl. X.R.

117—138.8 E, 161 UB, 161 UC, 232; 174—120 SR